United States Patent
Michalak et al.

[11] Patent Number: 5,835,006
[45] Date of Patent: *Nov. 10, 1998

[54] VIBRATOR ASSEMBLY

[75] Inventors: Brian Charles Michalak, Lindenhurst; Richard John Dombrowski, Lake Barrington, both of Ill.

[73] Assignee: Moorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 651,075

[22] Filed: May 22, 1996

[51] Int. Cl.⁶ ............................................. H04B 3/36
[52] U.S. Cl. ........................... 340/407.1; 340/311.1; 340/825.46; 310/81
[58] Field of Search ................ 340/407.1, 311.1, 340/825.46, 965; 310/81, 90; 368/230; 434/113; 318/114–115, 128–460; 379/52

[56] References Cited

U.S. PATENT DOCUMENTS

| | | | |
|---|---|---|---|
| 3,911,416 | 10/1975 | Feder | 340/311.1 |
| 4,780,098 | 10/1988 | Seidler | 439/876 |
| 4,786,889 | 11/1988 | Hayasaka | 340/311.1 |
| 4,794,392 | 12/1988 | Selinko | 340/825.46 |
| 4,893,351 | 1/1990 | McKee et al. | 340/311.1 |
| 5,107,155 | 4/1992 | Yamaguchi | 310/81 |
| 5,107,540 | 4/1992 | Mooney et al. | 340/407.1 |
| 5,124,611 | 6/1992 | Tamai et al. | 310/317 |
| 5,181,023 | 1/1993 | Fujii | 340/825.46 |
| 5,304,984 | 4/1994 | Roldan | 340/311.1 |
| 5,353,199 | 10/1994 | Ohashi | 361/809 |
| 5,374,205 | 12/1994 | Ohashi | 439/831 |
| 5,490,788 | 2/1996 | Mazzochette | 439/83 |
| 5,502,622 | 3/1996 | Cromwell | 361/801 |

*Primary Examiner*—Brent A. Swarthout
*Assistant Examiner*—Van T. Trieu
*Attorney, Agent, or Firm*—Mark D. Patrick

[57] ABSTRACT

A vibrator assembly (126) includes a vibrator (200) and a pair of clips (202, 204). The pair of clips (202, 204) are adapted to be mounted to a substrate (106) having a controllable power source (120). The pair of clips (202, 204) are electrically coupled to the controllable power source (120). The pair of clips (202, 204) are also adapted to engage the vibrator (200). The vibrator (200) is both secured and powered via the pair of clips (202, 204); thereby, eliminating the need for a separate mounting bracket and pair of wires.

18 Claims, 3 Drawing Sheets

VIBRATOR ASSEMBLY

FIELD OF THE INVENTION

This invention relates generally to vibrator assemblies and more specifically to a surface mountable vibrator assembly.

BACKGROUND OF THE INVENTION

Vibrators are used in a variety of devices. For example, pagers and radio telephones employ vibrators to effect a silent page or incoming call alerting signal. If the device is positioned against the user's body, such as by placement in a shirt pocket or hung from a belt, the vibration alerts the user without others hearing the device. This silent alert is particularly advantageous in meetings or in offices where a lot of people share common space.

The devices that employ a vibrator also employ circuit components mounted on a circuit board. These circuit components are preferably electrically connected to the circuit board by automated reflow heating. Vibrators, which operate from a DC voltage potential supplied thereto, also must be electrically attached to the circuit board. However, vibrators can not be connected to the circuit board by automated reflow heating. Vibrators are heat sensitive and easily damaged. Once damaged, they can not be readily repaired. Accordingly, vibrators must be electrically coupled to circuit boards via wires, a flex strip, or two pin connector employing wires that are structurally connected to the circuit board via hand soldering during a separate manufacturing step.

A vibrator must be securely mounted to the circuit board. Vibrators include a motor, a shaft driven by the motor, and a weight carried on the shaft. In operation, the motor rotates the weighted shaft causing the vibrator to vibrate significantly. The aforementioned electrical coupling via wires is not sufficient to secure the location of the vibrator in the device. Thus, to prevent damage to itself as well as other proximately positioned electrical components, the vibrator is mounted to the circuit board via a preformed bracket. The bracket is typically attached to the circuit board during a separate manufacturing step via hand soldering or automated reflow heating. The vibrator is then assembled into the bracket at the motor to ensure secure attachment.

Therefore, what is needed is a vibrator assembly that facilitates automated mounting so as to minimize manufacturing steps, allows for easy repair, and avoids the use of wires.

DETAILED DESCRIPTION OF THE PREFERRED EMBODIMENTS

A vibrator assembly includes a vibrator and a pair of clips. The pair of clips are adapted to be mounted to a substrate having a controllable power source. The pair of clips are electrically coupled to the controllable power source. The pair of clips are also adapted to removably engage the vibrator. The vibrator is secured and powered via the pair of clips; thereby, eliminating the need for a separate mounting bracket and pair of wires.

Figure 1:
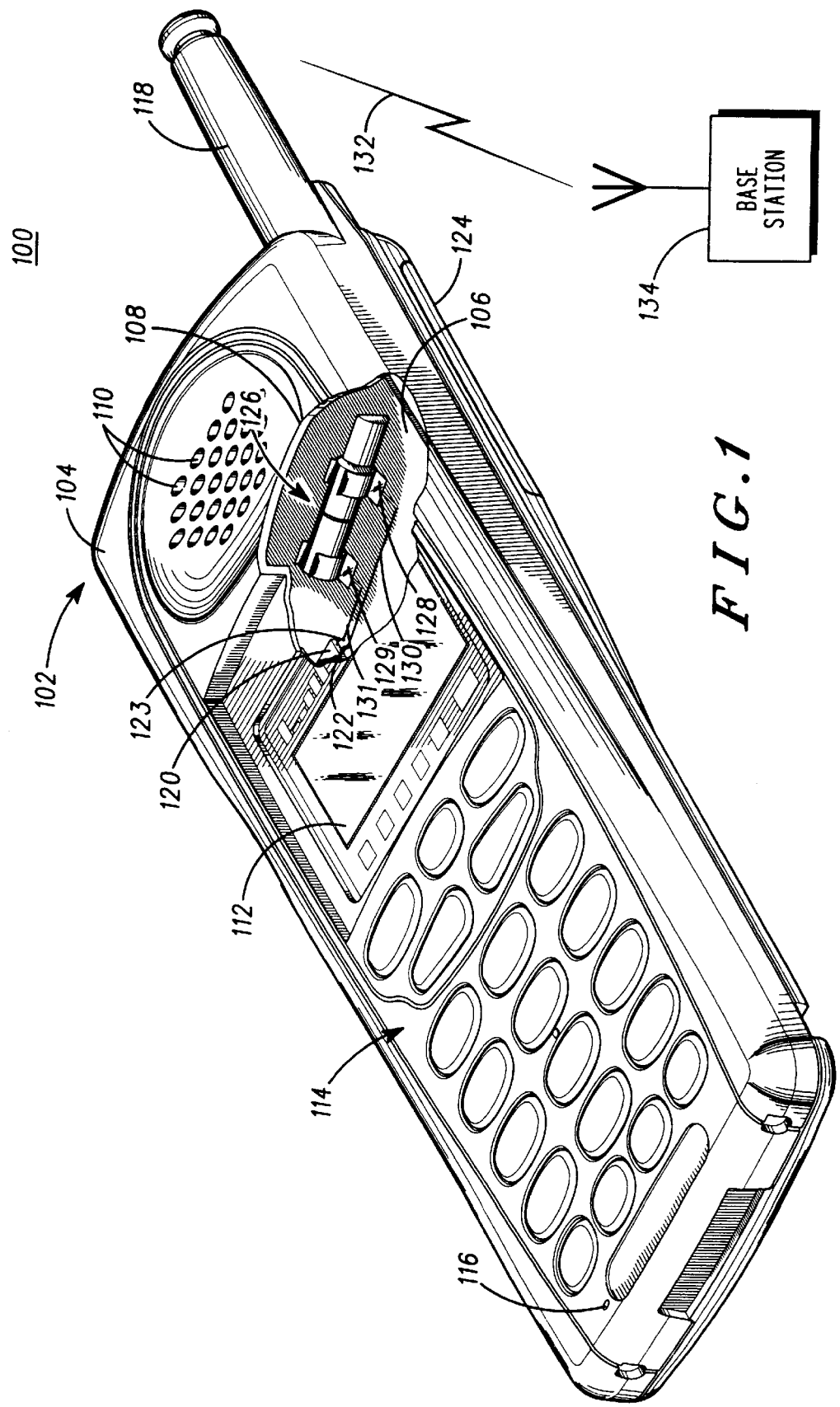
FIG. 1 illustrates a perspective view of a portable electronic device employing a vibrator assembly attached to a substrate.

FIG. 1 illustrates a radio communication system 100 including an electronic device 102. The electronic device 102, which is shown as a portable radio telephone, includes a housing 104 and a substrate 106 disposed within the housing 104 (but viewable via a cutaway area 108 of the housing 104). The housing 104 includes speaker bezel and openings 110 having a speaker (not shown) positioned therebehind, display 112, keypad 114, and microphone opening 116 having a microphone (not shown) positioned therebehind. An antenna 118 is carried on the housing 104. The antenna 118 is electrically connected to transceiver circuitry, such as a controllable power source 120. The controllable power source 120 is mounted on, and electrically connected to, a first pair of pads 122 and 123 of the substrate 106. The controllable power source 120 is powered by connections (not shown) to a battery 124 attached to a rear side of the housing 104. A vibrator assembly 126 is mounted on, and electrically connected to, a second pair of pads 128 and 129 of the substrate 106. The second pair of pads 128 and 129 are electrically connected to the first pair of pads 122 and 123 and the controllable power source 120 via a pair of respective traces 130 and 131.

Although the preferred embodiment is illustrated in a radio telephone, it will be recognized that the vibrator assembly may be advantageously employed in other devices such as pagers, personnel digital assistants, or the like. Accordingly, "device" as used herein will refer to all such equipment and their equivalents.

Figure 2:
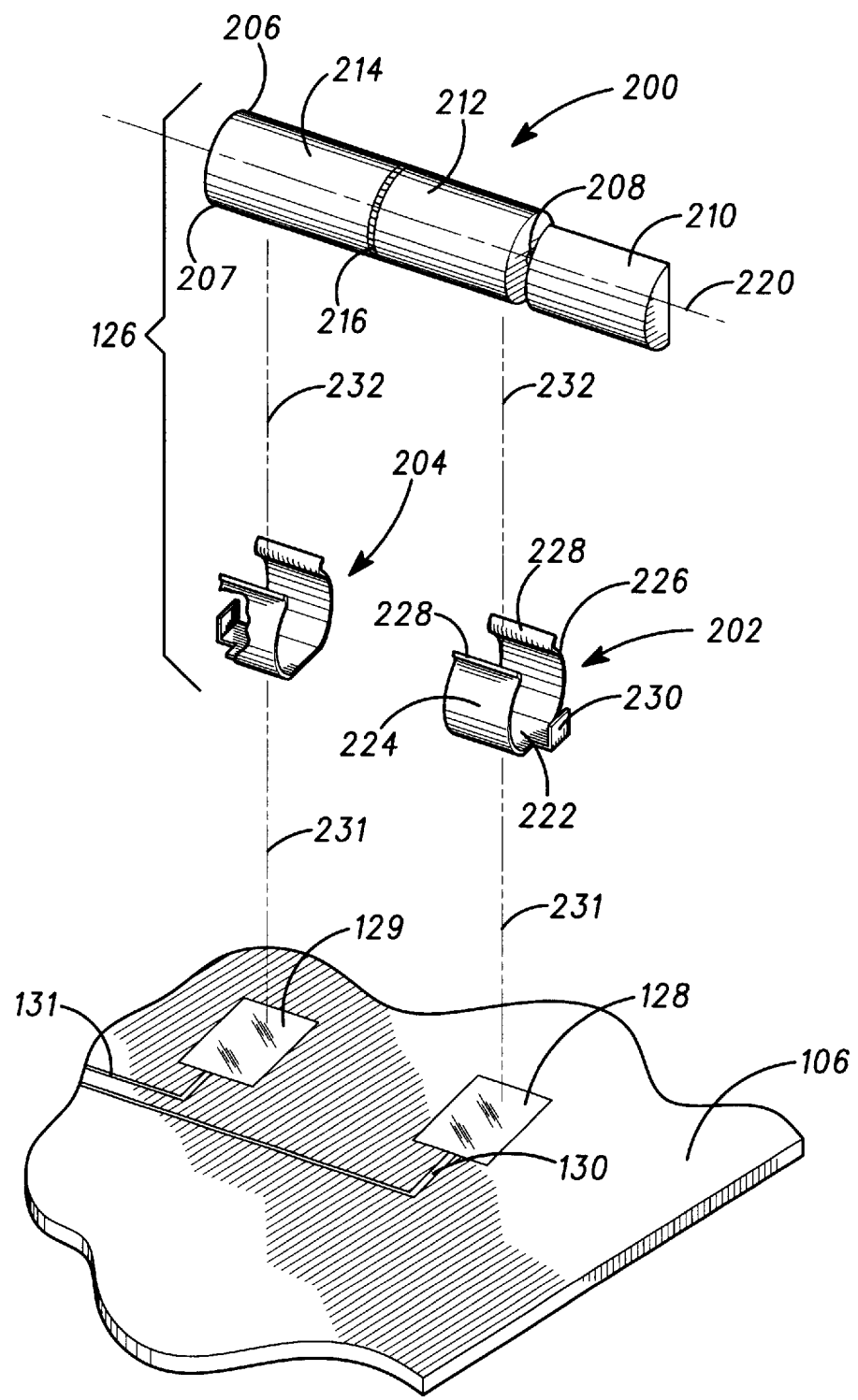
FIG. 2 illustrates an exploded perspective view of the vibrator assembly and the substrate of FIG. 1.

Turning to FIG. 2, the vibrator assembly 126 is shown exploded off of the substrate 106. The vibrator assembly 126 includes a vibrator 200 and a pair of clips 202 and 204. The vibrator 200 includes a motor 206, a shaft 208, and a weight 210. The motor 206 is cylindrical and employs a housing 207. The motor 206 is powered by a DC voltage potential applied to the housing 207. The housing 207 includes a first conductive portion 212 and a second conductive portion 214. The first conductive portion 212 and the second conductive portion 214 are comprised of stainless steel or other suitable conductive material. The first conductive portion 212 functions as the negative polarity terminal of the motor 206. The second conductive portion 214 functions as the positive polarity terminal of the motor 206. The first conductive portion 212 is electrically insulated from the second conductive portion 214 by an insulating portion 216 of the housing 207 disposed therebetween. The insulating portion 216 is comprised of polyimide film or other suitable non-conductive material. The first conductive portion 212, the insulating portion 216, and the second conductive portion 214 are aligned along a longitudinal axis 220 of the vibrator 200. The shaft 208 extends from one end of the motor 206 along the longitudinal axis 220. The motor 206, when powered, rotates the shaft 208. The weight 210 is positioned nonconcentrically on the distal end of the shaft 208 so as to rotate when the shaft 208 rotates. The nonconcentric positioning of the weight 210, as well as the size differential between the shaft 208 and the weight 210, causes the shaft 208 and the weight 210 to vibrate during rotation.

Each one of the pair of clips 202 and 204 is substantially identical. In order to maintain brevity, only one of the pair of clips 202 and 204 will be described in detail. Clip 202 includes a generally rectangular plate 222. First and second fingers 224 and 226 extend upward from opposing edges of the plate 222. As best seen in FIG. 2, the first and second fingers 224 and 226 curve inwardly toward one another. The end 228 of each one of the fingers 224 and 226 extends outwardly from the apex thereof. The fingers 224 and 226 are used to restrict movement of the motor 206 in the vertical and horizontal transverse plane. Clip 202 further includes a flange 230 extending outwardly and orthogonally upwardly from an edge of the plate 222. The flange 230 is positioned between the first and second fingers 224 and 226. The flange 230 (viewable on clip 204 via a cutaway area) is used to secure the longitudinal position of the motor 206 of the vibrator 200. Clip 202 may be constructed using any suitable conventional technology, such as from a one piece member that is stamped from a metal material, such as beryllium copper or other suitable material, and bent to the substantially "U"-shaped configuration illustrated in FIG. 2 using a progressive tooling die. The material is sufficiently resilient such that fingers 224 and 226 spread apart when the motor 206 is pressed downwardly towards the plate 222 during assembly and then return to their original position to hold the motor 206 securely in position.

The vibrator assembly 126 is assembled to the substrate 106 (shown in fragmentary form in FIG. 2) in the following manner. The clips 202 and 204 are preferably attached to the substrate 106 via an automated process. Initially, the substrate 106 is subjected to a screening process that deposits solder paste on the pads 128 and 129. The solder paste consists of tin-lead-silver alloy, or other suitable electrically conductive solder. Next, the clips 202 and 204 are juxtaposed with the pads 128 and 129, respectively, as represented by lines 231. Automated placement of the clips 202 and 204 is performed using any suitable, commercially available small part placement machine. Once placed, the plate 222 of each of the clips 202 and 204 align with the pads 128 and 129 of the substrate 106, respectively, and contact solder paste.

After placement, the substrate 106 is reflow heated to a temperature that is sufficient to melt the solder paste and then cooled to room temperature. A removable aluminum template may be employed to maintain alignment of the clips 202 and 204 with the pads 128 and 129 during reflow heating. Reflow heating takes approximately 660 seconds. During this time period, the temperature of the substrate 106 and clips 202 and 204 is increased to approximately 218° C. The melted solder forms a metallurgical interconnection between the clips 202 and 204 and the pads 128 and 129, respectively. Once cooled, the clips 202 and 204 of the vibrator assembly 126 are physically and electrically connected to the pads 128 and 129 of the substrate 106, respectively.

After the clips 202 and 204 are attached to the substrate 106, the vibrator 200 is attached to the clips 202 and 204. To assemble the vibrator 200, the motor 206 is moved in a downward direction, as represented by lines 232. The motor 206 contacts the ends 228 of the fingers 224 and 226 of the clips 202 and 204. The fingers 224 and 226 are pressed outwardly by the motor 206 as it continues to be moved downward toward the plate 222 of the clips 202 and 204. The flange 230 of the clips 202 and 204 engage end surfaces of the motor 206. The shaft 208 of the vibrator is long enough to ensure adequate clearance for flange 230 of clip 202 between the weight 210 and the motor 206. Once assembled, the first conductive portion 212 only contacts clip 202 and the second conductive portion 214 only contacts clip 204. The fully assembled position is illustrated in FIG. 1. Automated placement of the vibrator 200 can be accomplished by using a commercially available robotic arm.

Once assembled, the vibrator 200 is operational to alert a user upon reception of a call. Referring to FIG. 1, the electronic device 102 receives a call in the radio communication system 100 via a radio frequency (RF) signal 132, such as a paging signal, communicated from a base station 134. The antenna 118 detects the RF signal 132 and couples it to the transceiver circuitry. Responsive to detection, the controllable power source 120 generates a DC (direct current) voltage potential across the first pair of pads 122 and 123. In the preferred embodiment, controllable power source 120 generates a positive polarity on pad 122 and a negative polarity on pad 123. The pair of traces 130 and 131 and the second pair of pads 128 and 129 coupled the DC voltage potential to the pair of clips 202 and 204 of FIG. 2, respectively. The pair of clips 202 and 204 apply the DC voltage potential to the first conductive portion 212 and the second conductive portion 214 of the housing 207 of the motor 206. The motor 206, responsive to the DC voltage potential, begins to rotate the shaft 208 and the weight 210; thereby, creating a silent incoming call alert signal discernible to the user of the electronic device 102.

Figure 3:
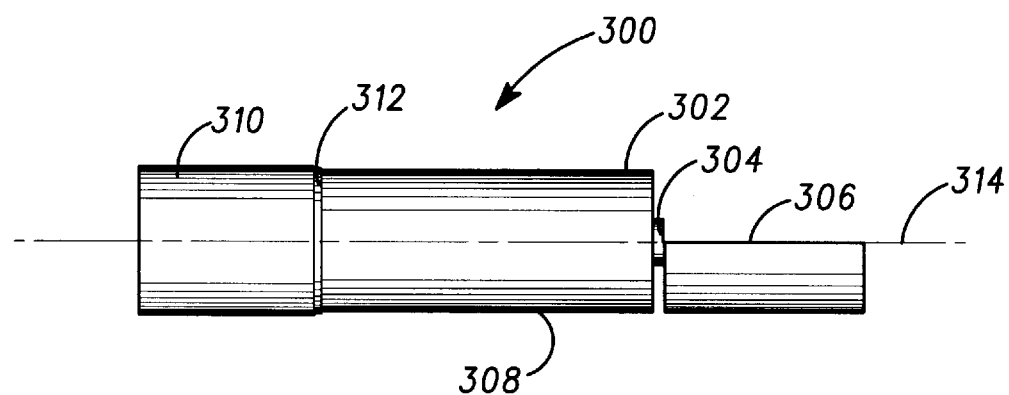
FIG. 3 illustrates an alternate vibrator assembly.
Figure 4:
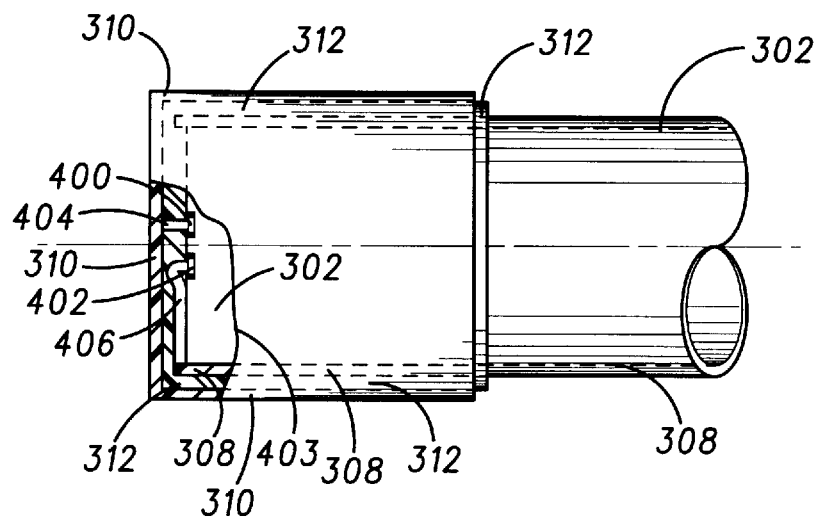
FIG. 4 illustrates an enlarged, partial, cut away view of the alternate vibrator assembly of FIG. 3.

FIGS. 3 and 4 illustrates an alternate vibrator 300 for use with the vibrator assembly 126 and the electronic device 102 of FIG. 1. The alternate vibrator 300 employs a conventional vibrator that has been retrofitted. The conventional components of the alternate vibrator 300 include a motor 302, a shaft 304 driven by the motor 302, and a weight 306 positioned on the shaft 304. Also, the motor 302 includes a housing 308 that is cylindrical and comprised of a conductive material, such as stainless steel or other suitable metal. Also, the motor 302 of the conventional vibrator generally employs terminals, such as a positive terminal 400 and a negative terminal 402 shown via a cutaway 403 of FIG. 4, disposed on the end of the motor 302 opposite the shaft 304. The motor 302 is powered by a DC voltage potential supplied by wires (not shown) to the terminals.

However, unlike the conventional vibrator, the alternate vibrator 300 includes a cap 310 and an insulator 312 fit to the end of the motor 302 opposite the shaft 304 as represented by dotted lines in FIG. 4. The cap 310 is cylindrical and comprised of a conductive material, such as stainless steel or other suitable metal. The insulator 312, which is disposed between the housing 308 and the cap 310, is preferably comprised of polyimide film or other suitable nonconductive material. Furthermore, the cap 310 is electrically connected to the positive terminal 400 via a first wire 404. The housing 308 is electrically connected to the negative terminal 402 via a second wire 406. The insulator 312 electrically insulates the housing 308 from the cap 310. The cap 310, the insulator 312, and the housing 308 are concentrically arranged with respect to a longitudinal axis 314 of the alternate vibrator 300.

The thickness of the material comprising the cap 310 and the insulator 312 adds only negligibly to the diameter of the motor 302. As such, the alternate vibrator 300 can be assembled to the clips 202 and 204 of FIG. 2 in the same manner previously described with respect to the vibrator 200. Once assembled, the housing 308 resides in contact with clip 202 and in isolation from clip 204; and the cap 310 resides in contact with clip 204 and in isolation from clip 202. The alternate vibrator 300 is then operated by the controlled power source 120 in the aforementioned manner.

Thus it can be seen that a vibrator assembly is disclosed employing only a vibrator and surface mountable clips that facilitate automated assembly. The surface mountable clips anchor the vibrator to a substrate and electrically couples the vibrator to circuitry supported on the substrate. Thus, the need for a separate mounting bracket and pair of wires is eliminated.

What is claimed is:

1. A vibrator assembly comprising:

a vibrator including a motor and a weight driven by the motor, the motor having a housing, the housing having first and second surface terminals insulated from one another, the motor operable to drive the weight responsive to power applied across the first and second surface terminals; and first and second clips adapted to be mounted to a substrate having a controllable power source, the first and second clips coupled to the controllable power source, the first clip adapted to detachably engage the first surface terminal, the second clip adapted to detachably engage the second surface terminal, and thereby supply power across the first and second surface terminals.

2. The vibrator assembly of claim 1 wherein at least one of the first and second surface terminals is cylindrical.

3. The vibrator assembly of claim 1 wherein the first and second surface terminals are axially aligned.

4. The vibrator assembly of claim 1 wherein the housing includes an insulating portion disposed between and axially aligned with the first and second surface terminals.

5. The vibrator assembly of claim 1 wherein the first and second surface terminals are concentrically aligned.

6. The vibrator assembly of claim 1 wherein the vibrator is substantially cylindrical.

7. The vibrator assembly of claim 1 wherein at least one of the first and second clips is substantially "U"-shaped.

8. The vibrator assembly of claim 1 wherein at least one of the first and second clips further comprises a flange contacting an end surface of the housing.

9. The vibrator assembly of claim 1 wherein the vibrator assembly is disposed in an electronic device.

10. A vibrator assembly comprising:

a vibrator including a motor, a shaft driven by the motor, and a weight positioned on the shaft, the motor comprising a conductive housing, the conductive housing comprising a first conductive portion and a second conductive portion, the first conductive portion and the second conductive portion concentrically aligned, the conductive housing further comprising an insulating portion concentrically disposed on the first conductive portion and substantially enclosing an end of the vibrator, and the second conductive portion comprising a conductive cap fitted on the end of the vibrator over the insulating portion; and a pair of clips adapted to be mounted to a substrate having a controllable power source, the pair of clips electrically coupled to the controllable power source, the pair of clips adapted to engage the motor of the vibrator, one of the pair of clips contacting the first conductive portion, the other one of the pair of clips contacting the second conductive portion.

11. An electronic device comprising:

a substrate having first and second pads and a controllable power source mounted thereon, the controllable power source electrically coupled to the first and second pads;

first and second clips mounted on the substrate, the the first clip electrically coupled to the first pad, the second clip electrically coupled to the second pad; and a vibrator including a motor and a weight driven by the motor, the motor having a housing, the housing having first and second surface terminals and an insulator positioned therebetween, the first surface removably received in the first clip, the second surface removably received in the second clip.

12. The electronic device of claim 11 wherein at least one of the first and second surface terminals are cylindrical.

13. The electronic device of claim 11 wherein the first and second surface terminals are axially aligned.

14. The electronic device of claim 11 wherein the housing includes an insulating portion disposed between and axially aligned with the first and second surface terminals.

15. The electronic device of claim 11 wherein the first and second surface terminals are concentrically aligned.

16. The electronic device of claim 11 wherein the vibrator is substantially cylindrical.

17. An electronic device comprising:

a substrate having at least two pads and a controllable power source mounted thereon, the controllable power source electrically coupled to the at least two pads;

a pair of clips mounted on the substrate, the pair of clips electrically coupled to corresponding ones of the at least two pads; and a vibrator including a motor, a shaft driven by the motor, and a weight positioned on the shaft, the motor adapted to be received in the pair of clips the motor of the vibrator further comprising a conductive housing, the conductive housing comprising a first conductive portion contacting one of the pair of clips and a second conductive portion contacting the other one of the pair of clips, the first conductive portion and the second conductive portion concentrically aligned, the conductive housing further comprising an insulating portion concentrically disposed on the first conductive portion and substantially enclosing an end of the vibrator, and the second conductive portion comprising a conductive cap fitted on the end of the vibrator over the insulating portion.

18. An electronic device comprising:

a substrate having a first pad, a second pad, and a controllable power source mounted thereon, the controllable power source electrically coupled to the first pad and the second pad, the controllable power source capable of energizing the first pad with one of a positive polarity and a negative polarity and the second pad with the other one of the positive polarity and the negative polarity;

a first clip and a second clip mounted on the substrate, the first clip electrically coupled to the first pad, the second clip electrically coupled to the second pad, at least one of the first clip and the second clip being substantially "U"-shaped; and a vibrator including a motor and a weight driven by the motor, the motor having a substantially cylindrical housing, the substantially cylindrical housing having a first surface terminal axially adjacent to a second surface terminal, the first surface terminal detachably coupled to the first clip, the second surface terminal detachably coupled to the second clip.

* * * * *

UNITED STATES PATENT AND TRADEMARK OFFICE
CERTIFICATE OF CORRECTION

PATENT NO. : 5,835,006
DATED : November 10, 1998
INVENTOR(S) : Michalak, Brian Charles, et al.

It is certified that error appears in the above-identified patent and that said Letters Patent is hereby corrected as shown below:

In column 5, line 59, please replace "the the" with --the--.

Signed and Sealed this

Sixteenth Day of March, 1999

Attest:

Q. TODD DICKINSON

*Attesting Officer*  *Acting Commissioner of Patents and Trademarks*